United States Patent
Kraipak et al.

(10) Patent No.: US 12,380,072 B1
(45) Date of Patent: Aug. 5, 2025

(54) METHOD AND SYSTEM FOR PERFORMING A COMPACTION/MERGE JOB USING A MERGE BASED TILE ARCHITECTURE

(71) Applicant: Marvell Asia Pte Ltd, Singapore (SG)

(72) Inventors: Waseem Kraipak, Hyderabad (IN); Brian Michael Rogers, Durham, NC (US); Pradipkumar Arunbhai Thaker, Bangalore (IN)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/816,129

(22) Filed: Jul. 29, 2022

Related U.S. Application Data

(60) Provisional application No. 63/313,204, filed on Feb. 23, 2022.

(51) Int. Cl.
| | |
|---|---|
| *G06F 7/00* | (2006.01) |
| *G06F 16/21* | (2019.01) |
| *G06F 16/215* | (2019.01) |
| *G06F 16/22* | (2019.01) |

(52) U.S. Cl.
CPC .......... *G06F 16/215* (2019.01); *G06F 16/217* (2019.01); *G06F 16/2282* (2019.01)

(58) Field of Classification Search
CPC ... G06F 16/215; G06F 16/217; G06F 16/2282
USPC ..... 707/639, 692, 693, 769, 822; 711/5, 154
See application file for complete search history.

(56) References Cited

U.S. PATENT DOCUMENTS

| | | | | |
|---|---|---|---|---|
| 2014/0247673 | A1* | 9/2014 | Muralimanohar | G11C 7/1006 365/189.02 |
| 2017/0032012 | A1* | 2/2017 | Zhang | G06F 16/1748 |
| 2022/0156231 | A1* | 5/2022 | Wang | G06F 16/9027 |
| 2022/0319597 | A1* | 10/2022 | Moyer | G11C 15/046 |
| 2022/0335027 | A1* | 10/2022 | Subramanian Seshadri | G06F 16/215 |
| 2022/0413940 | A1* | 12/2022 | Yeom | G06F 9/5038 |

* cited by examiner

*Primary Examiner* — Md I Uddin
(74) *Attorney, Agent, or Firm* — Hamilton, Brook, Smith & Reynolds, P.C.

(57) ABSTRACT

A hardware-based compaction accelerator may comprise two or more decoders, a merge iterator, a compaction module, and an encoder. Each of the decoders converts a sorted string table (SST) files into a corresponding key-value (KV) format data stream. The merge iterator receives a KV format data stream from each of the decoders, and combines the KV format data streams into a single KV format data stream. The compaction module receives the composite KV format data stream and produces a compacted data stream. The compacted data stream contains less data that is in the composite KV format data stream. The encoder converts the composite KV format data stream back into one or more output SST files. The compaction accelerator may be configured to perform only a subset of the processing available from the decoders, merge iterator, compaction module, and encoder, and may be configured through the Internet using a cloud-based processor.

6 Claims, 10 Drawing Sheets

SST file format:

Header

| Key length | Value length |
|---|---|
| 5 | 13 |
| 8 | c |
| 5 | 9 |

FIG. 5C

Key

| 31 | 32 | 33 | 34 | 35 | 36 | 37 | 38 |
|---|---|---|---|---|---|---|---|
| 39 | 3A | 3B | 3C | 3D | 3E | 3F | 40 |
| 41 | 42 | 43 | 0 | 0 |  | 0 | 0 |
| 31 | 32 | 33 | 34 | 35 | 51 | 52 | 53 |
| 54 | 55 | 56 | 57 | 0 | 0 | 0 | 0 |
| 31 | 32 | 33 | 61 | 62 | 63 | 64 | 65 |
| 66 | 0 | 0 | 0 | 0 | 0 | 0 | 0 |

FIG. 5D

Value

| 11 | 22 | 33 | 44 | 55 | 0 | 0 | 0 |
|---|---|---|---|---|---|---|---|
| 66 | 77 | 88 | 99 | aa | BB | CC | DD |
| EE | FF | 0 | 11 | 22 | 0 | 0 | 0 |

METHOD AND SYSTEM FOR PERFORMING A COMPACTION/MERGE JOB USING A MERGE BASED TILE ARCHITECTURE

RELATED APPLICATIONS

This application claims the benefit of U.S. Provisional Application No. 63/313,204, filed on Feb. 23, 2022. The entire teachings of the above application are incorporated herein by reference.

BACKGROUND

Many present-day enterprises rely on databases that contain large amounts of data. To conserve finite memory resources, such databases are routinely subjected to a compaction operation that reduces the size of the database, for example by eliminating redundant information. State-of-the-art compaction schemes tend to be computationally intensive, where processing resources are redirected from primary jobs to facilitate the compaction. For large databases, the compaction operation may take days or even weeks.

A RocksDB key-value data storage engine, based on a log structured merge (LSM) tree data structure, is used as an example herein for describing certain concepts related to database operation in general. It should be understood, however, that the RocksDB architecture is used as a descriptive example only, and that the concepts presented herein may apply to other database architectures.

Each record submitted to the database creates a sorted string table (SST) file, although multiple SST files may be created for the same record. An SST is a file of key/value pairs, sorted by keys. An SST provides a persistent, ordered, and immutable map from keys to values, where both keys and values are arbitrary byte strings. Operations are provided to look up the value associated with a specified key, and to iterate over all key/value pairs in a specified key range. As stated with respect to the RocksDB architecture, SST files are being used herein for descriptive purposes only. Other file formats may also be used consistent with the descriptions herein.

Compaction is, in general, reducing the size of a data set by removing unnecessary or unwanted data. In the context of the RocksDB system architecture, compaction is taking a set of many SST files and producing therefrom one SST file or just a few SST files that have less total data than the input set of SST files. A variety of criteria may be employed to perform compaction. For example, redundant data may be removed. Further, a "time to live" (TTL) parameter may be used as a compaction criterion to remove older, stale data that has been kept beyond the its TTL threshold.

The RocksDB data is stored in sorted order in a collection of SSTs in different levels. FIG. 1 shows a simplified architecture of RocksDB using LSM tree and leveled compaction. FIG. 2 illustrates the write path in an example RocksDB architecture. Data written to the database exists as an in-memory copy of the data in random access memory (RAM; called mem table or mem cache). Eventually this memory buffer will fill up, and the data stored in RAM is copied to a solid-state drive (SSD) or disk drive, or other such non-volatile storage medium. Periodically, the non-volatile memory is compacted to maintain a sufficient amount of available space for subsequent copy-transfers from RAM.

FIG. 3 shows the RocksDB read path. In general, data reads may be problematic because the required data could be either in local memory (e.g., active mem_tables or read-only mem_tables) or in non-volatile storage (e.g., SSD). To implement the read, the various memory sources may be scanned to identify the most recent version of the key.

As an LSM storage engine, RocksDB uses a set of background threads for compaction, which is a process of combining a set of SST files and generating new SST files with overwritten keys and deleted keys purged from the new SST files. Compaction requires a substantial amount of computational resources. The higher the write rate into the database, the more compute resources are needed for compaction, because the system is stable only if compaction has the capability to keep up with new writes to the database.

SUMMARY

The embodiments described herein are directed to a method of and system for compaction of data stored in a database. The described embodiments utilized a hardware-based, dedicated compaction accelerator to perform the compaction, thereby reducing the support required from processor assets. The hardware-based, dedicated accelerator may operate independently from external processing assets such as the database processing system. Example embodiments of the invention may utilize a hardware-based merge tile as a basic building block to form a scalable merge and compaction architecture. The hardware-based components of the compaction accelerator and the merge tile may include, for example a field programmable gate array (FPGA), an application-specific integrated circuit (ASIC), or other such hardware component known in the art. The hardware-based components of the compaction accelerator may comprise an instruction based processing unit or microcontroller that manages and/or coordinates the hardware-based components of the compaction accelerator. The hardware-based components may be configured to operate independent of external processing facilities, but may be controlled internally by an instruction-based processor or controller, or by a state machine.

In one aspect, the invention may be a compaction accelerator, comprising a direct memory access (DMA) controller configured to access one or more sorted string table (SST) files in a database system, and two or more merge tiles that receive the one or more SST files from the DMA controller. Each merge tile may comprise (i) two or more decoders, each of which converts one of the one or more SST files into a corresponding key-value (KV) format data stream, (ii) a merger iterator that receives the KV format data stream from each of the two or more decoders, and combines the KV format data streams into a single KV format data stream, (iii) at least one arbiter that generates one or more timing signals associated with each of the KV format data streams, (iv) and at least one merge integrator that receives the single KV format data stream from each of the two or more merge tiles and produces a composite KV format data stream therefrom. The two or more merge tiles and the at least one merge integrator may be implemented, at least partially, as hardware components.

The key-value (KV) format may comprise an ordered set of key-value pairs. The compaction accelerator may further comprise a compaction module that receives the composite KV format data stream and produces a compacted data stream. The compacted data stream may have an amount of data less than an amount of data in the composite KV format data stream. The compaction module may remove redundant data from the composite KV format data stream. The compaction module may remove data that has exceeded an expiration time threshold.

The two or more merge tiles may operate independent of the database system. The hardware components may comprise a field programmable gate array, an application-specific integrated circuit, a processor operatively coupled to a memory that contains processor instruction code, and/or a microcontroller operatively coupled to a memory that contains microcontroller instruction code. Other hardware components known in the art may also be used.

In another aspect, the invention may be a compaction tile, comprising two or more decoders, each of which converts one or more sorted string table (SST) files into a corresponding key-value (KV) format data stream, and a merge iterator that receives at least two KV format data streams, one from each of the two or more decoders, and combines the two KV format data streams into a single KV format data stream. The compaction tile may further include a compaction module that receives the composite KV format data stream and produces a compacted data stream. The compacted data stream may have an amount of data less than an amount of data in the composite KV format data stream. The compaction tile may also include an encoder that converts the composite KV format data stream into one or more output SST files.

The compaction tile may further comprise one or more multiplexors, each of which selectively routes data from and/or to components of the compaction tile. The compaction tile may be operatively coupled to a direct memory access engine that transfers SST files to the compaction tile, and receives one of (i) the compacted data stream from the compaction module or (ii) the one or more SST files from the encoder.

An AXIS steaming protocol extension may be used to convey information between the direct memory access engine and the compaction tile. The AXIS streaming protocol extension may comprise (a) a data signal that conveys data elements in the form of data chunks, (b) a clock signal that identifies boundaries of the data elements, (c) a last-of-chunk signal that identifies boundaries of the data chunks, (d) an end-of-block signal that identifies boundaries of blocks of the data chunks, (e) an end-of-sequence signal that identifies boundaries of sequences of the blocks of data chunks, and (f) a start signal encompasses the sequence of blocks of data chunks.

One or more components of the compaction tile may be formatted by metadata information that accompanies the SST files. The metadata information may comprise (i) a length field that describes an amount of data that is in a subsequent data field, (ii) a decompression type field that describes an algorithm to be used for compression of the KV data, (iii) a control field describes if the current chunk is an end of a block, an end of sequence, both, or neither, (iv) an output-type field that describes a state of data exiting the compaction tile; and/or (v) an input-type field that describes a state of data entering the compaction tile. At least one of the output-type field and the input-type field may be used to selectively route data within the compaction tile. The metadata may be supplied by an external computing resource, and is communicated to the compaction tile by way of one or more Internet pathways.

An Internet Protocol (IP) address may be associated with the compaction tile, and the external computing resource may supply the metadata to the compaction tile by addressing the compaction tile with the IP address.

In another aspect, the invention may be a data compaction system, comprising two or more compaction machines, a direct memory access engine, and an Internet Protocol (IP) address associated with each of the compaction machines. Each of the compaction machines may comprise two or more decoders, each of which converts one or more sorted string table (SST) files into a corresponding key-value (KV) format data stream. Each of the compaction machines may further comprise a merge iterator that receives two or more KV format data streams, one from each of the two or more decoders, and combines the two or more KV format data streams into a single KV format data stream. Each of the compaction machines may further comprise a compaction module that receives the composite KV format data stream and produces a compacted data stream. The compacted data stream may have an amount of data less than an amount of data in the composite KV format data stream. Each of the compaction machines may further comprise an encoder that converts the composite KV format data stream into one or more output SST files. The direct memory access engine may transfer SST files to the two or more compaction machines, and receive one or more compacted SST files from the two or more compaction machines.

One or more components of the data compaction system may be formatted by metadata information. An external computing resource may supply the metadata to the two or more compaction machines by addressing each of the two or more compaction machines by the respective IP addresses. The two or more compaction machines may comprise a first set of compaction machines and a second set of compaction machines. The first set of compaction machines may merge a set of SST files into N KV format data streams, and the second set of compaction machines merges the N KV format data streams into M KV format data streams, where M and N are integers and M is less than N.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5A illustrates the format of an example SST file according to an embodiment of the invention.

FIG. 5B illustrates an example embodiment of a header of the decoded data stream based on the SST file.

FIG. 5C shows the key data extracted from the SST file.

FIG. 5D shows the value data extracted from the SST file.

DETAILED DESCRIPTION

A description of example embodiments follows.

The teachings of all patents, published applications and references cited herein are incorporated by reference in their entirety.

The described embodiments of the invention are directed to the task of compacting data stored in a database, using hardware components to substantially reduce or eliminate intervention by system processing assets.

The example embodiments described herein illustrate compaction of data stored in a RocksDB key-value data storage engine, which is based on a log structured merge (LSM) tree data structure. It should be understood, however, that the RocksDB architecture is used as a descriptive example only, and that the concepts presented herein may apply to other database architectures.

Figure 1:
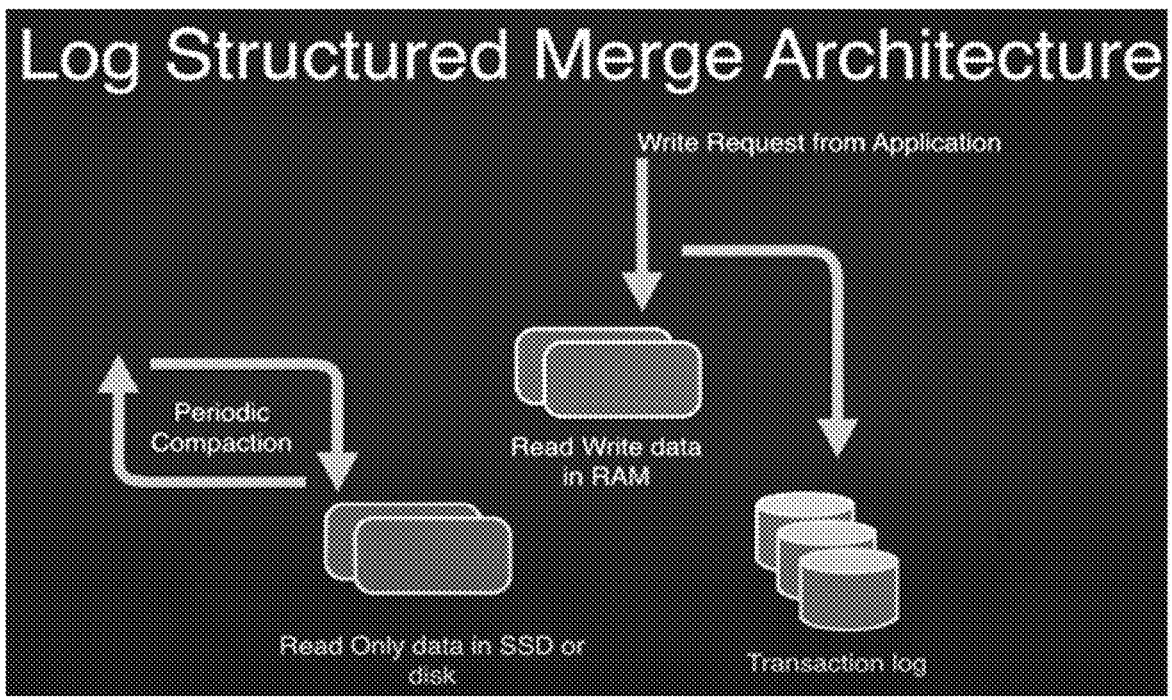
FIG. 1 shows a simplified architecture of RocksDB using LSM tree and leveled compaction.
Figure 2:
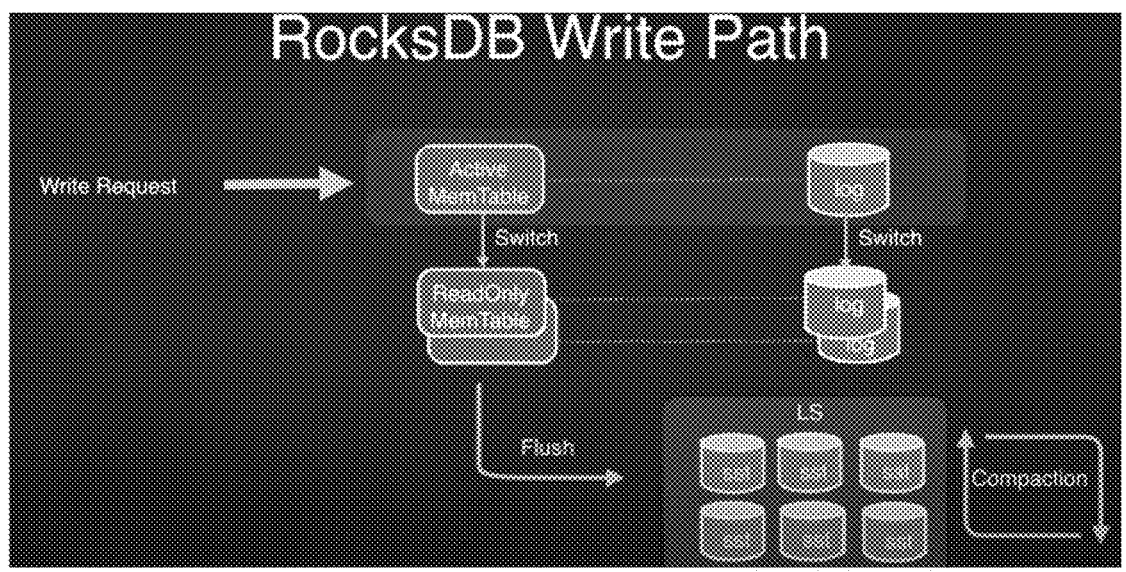
FIG. 2 illustrates the write path in an example RocksDB architecture.
Figure 3:
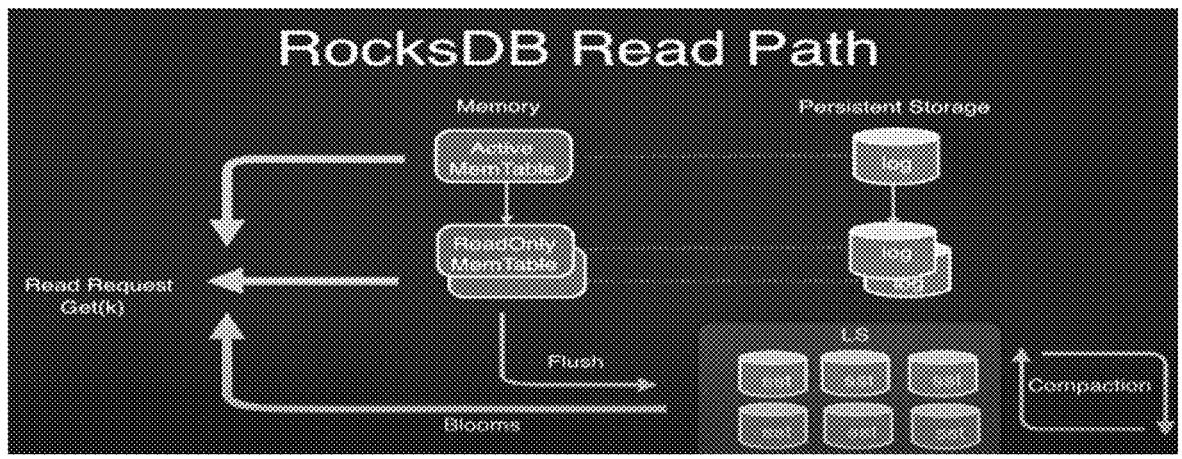
FIG. 3 shows the RocksDB read path.
Figure 4:
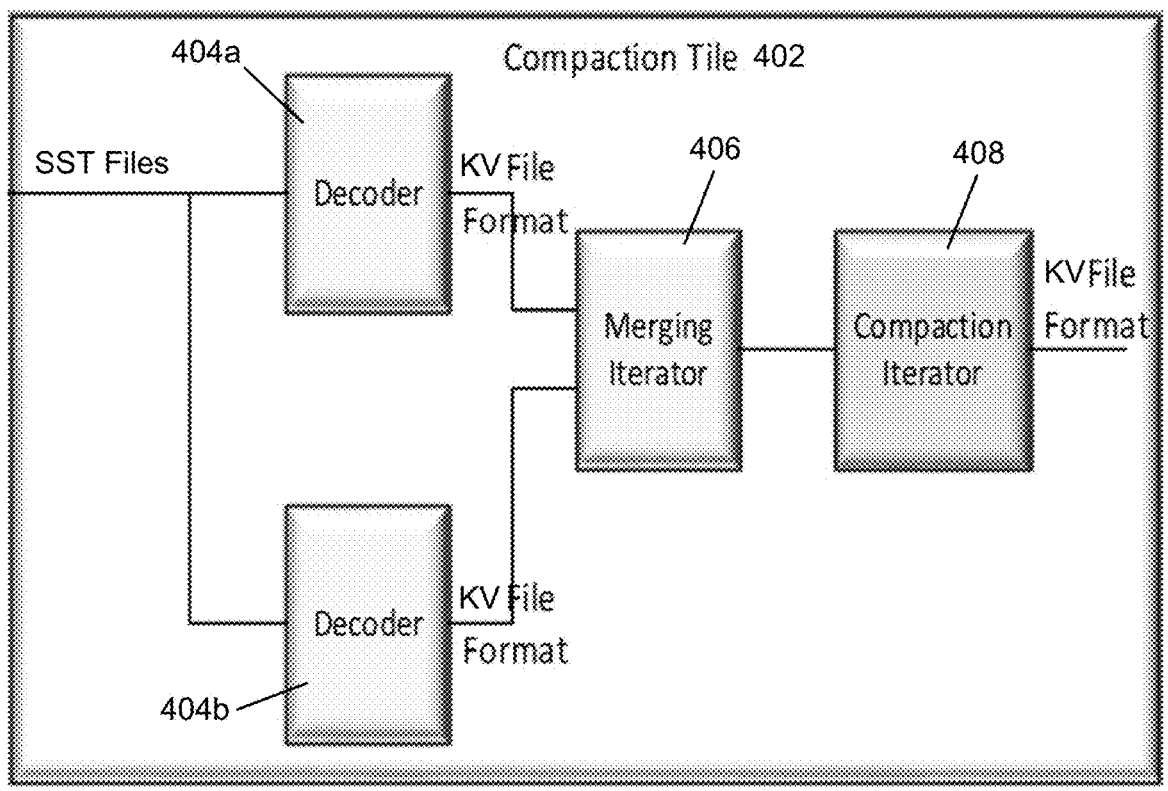
FIG. 4 illustrates the basic compaction tile architecture of the described embodiments according to the invention.

FIG. 4 illustrates the basic compaction tile architecture of the described embodiments. The compaction tile 402 receives sorted string table (SST) files, and produces the received information in key-value (KV) file format. The compaction tile 402 comprises two decoder modules 404a and 404b configured to decode two input SST files. A merging iterator 406 (also referred to herein as "merge iterator") merges the decoded KV file format streams into a single, combined KV file format stream. A compaction iterator 408 reduces the merge footprint by removing the duplicate key, and produces the reduced KV file format stream.

FIG. 5A illustrates the format of an example SST file. The red hexadecimal data represents SST header information, with each SST header consisting of three hexadecimal bytes. The first hexadecimal byte of the SST header describes how many of the initial key bytes are to be repeated. The second hexadecimal byte of the SST header describes the number of key hexadecimal bytes will follow, and the third hexadecimal byte of the SST header describes how many value bytes will follow.

As shown in FIG. 5A, the first header is 00 13 05, which informs that no previous bytes will be repeated, there are 19 (i.e., 13 hexadecimal or $13_{16}$) to follow, and there are five value bytes to follow. The green hexadecimal data represents the key information, and the purple hexadecimal data represents the value information. Thus, the first 19 bytes after the header are key bytes (i.e., 31 32 33 34 35 36 37 38 39 3A 3B 3C 3D 3E 3F 40 41 42 43), and the next five bytes after the key bytes are value bytes (i.e., 11 22 33 44 55).

The second header is 05 07 08, which means that the first five bytes of the initial key are repeated, to be followed by seven bytes of key data and eight bytes of value data. Thus, the second header indicates that the subsequent key will be 05+07=12 (i.e., $C_{16}$) bytes long, and based on the example SST file shown in FIG. 5A, will be 31 32 33 34 35 51 52 53 54 55 56 57. Since the third value of the header is 08, the next eight bytes will be the corresponding value (i.e., 66 77 88 99 AA BB CC DD).

FIG. 5B illustrates an example embodiment of a header of the decoded data stream based on the SST file, which shows KV pairs, with the first column being the value length and the second column showing key length. As described above, the first value length is 5 and the first key length is $13_{16}$. The second value length is 8, and the second key length is $C_{16}$.

Following the decoded header are the key data extracted from the SST file, as shown in FIG. 5C, and following the key data are the value data extracted from the SST file, as shown in FIG. 5D.

Figure 6:
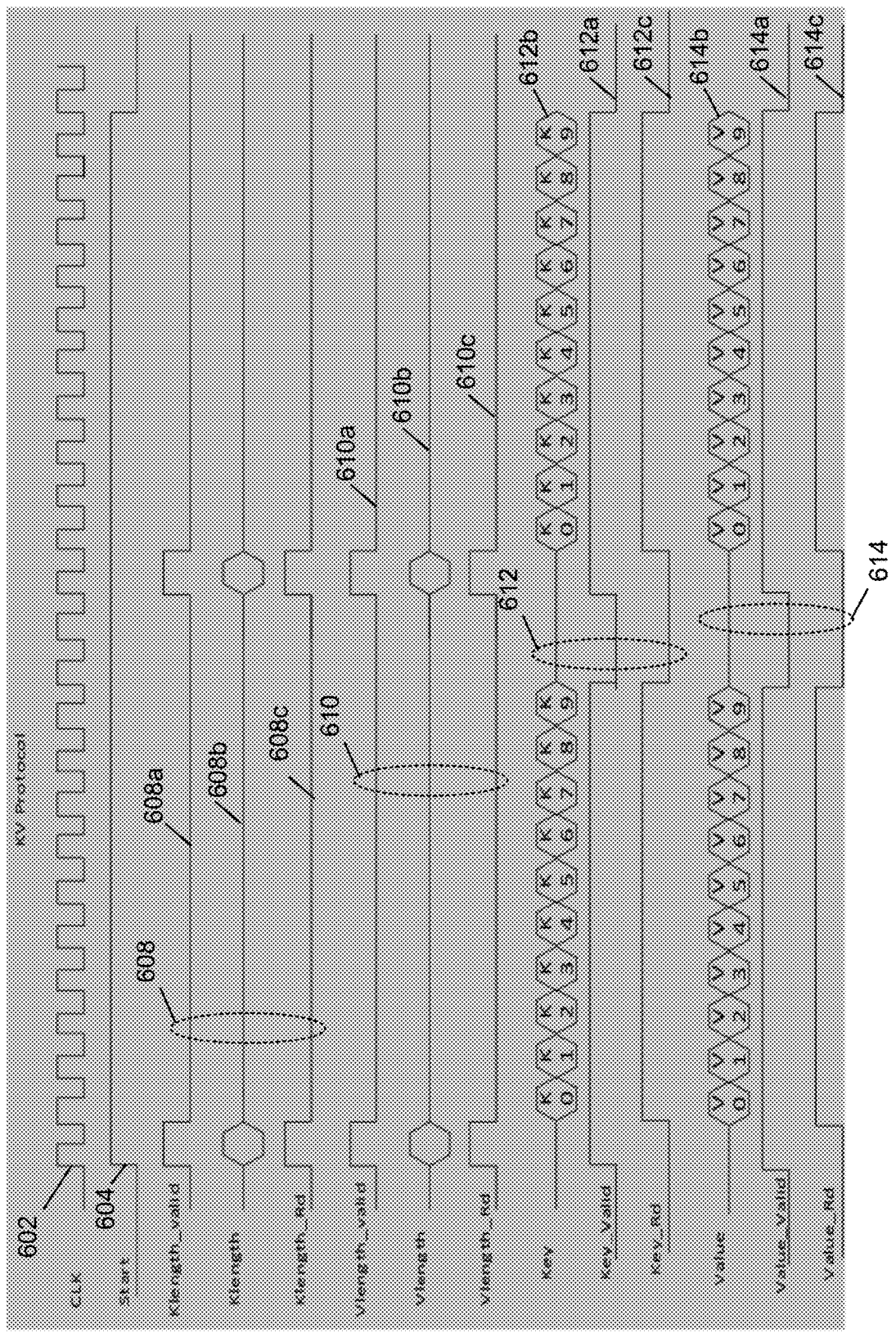
FIG. 6 illustrates an example KV protocol for conveying the header, key data and value data for the KV file format output from the decoders.

FIG. 6 illustrates an example KV protocol for conveying the header, key data and value data for the KV file format output from the decoders 404a, 404b. A clock signal 602 cycles at the data rate of the key data 612b and the value data 614b. A start signal 604 identifies the start and end of a key and value data transfer, and indicates to the down-stream logic that a valid decoded stream is available for merge and/or compaction.

A key length signal set 608, having a key length valid signal 608a, a key length data signal 608b, and a key length read signal 608c, conveys the key length data. A value length signal set 610, having a value length valid signal 610a, a value length data signal 610b, and a value length read signal 610c, conveys the value length data.

The key length valid signal 608a and the value length valid signal 610a indicate a valid length of key and valid length of value, respectively. The key length read signal 608c and value length read signal 610c are driven by down-stream logic to fetch the key length and value length, respectively.

A key signal set 612, having a key valid signal 612a, a key data signal 612b, and a key read signal 612c, conveys the key data. A value signal set 614, having a value valid signal 614a, a value data signal 614b, and a value read signal 614c, conveys the value data.

The key valid signal 612a indicates a valid key is available. The key read signal 612c is asserted by down-stream logic to read the key data 612b. Using the key length data 608b, the down-stream logic asserts the key read signal 612a as many times as necessary to read all the key data 612b.

The value valid signal 614a indicates a valid value is available. The value read signal 614c is asserted by down-stream logic to read the value data 614b. Using the value length data 610b, the down-stream logic asserts the value read signal 614a as many times as necessary to read all the value data 614b.

The merging iterator 406 takes in the KV file format streams of ordered key-value pairs from the decoders 404a, 404b, and produces a single stream of ordered key-value pairs based the KV file format streams. The merging iterator thus reorders and combines the information in the input SST files. For every key received by the merging iterator 406, one key is produced at the output. The merging iterator 406 does not drop duplicate keys or perform any other merge or compaction tasks.

The compaction iterator 408 receives the single stream of ordered key-value pairs from the merging iterator 406 and produces a single stream of compacted key-value pairs therefrom. Based on a set of predetermined compaction rules, the compaction iterator 408 may produce fewer keys and values than it received. The compaction iterator evaluates each key from the received stream of key-value pairs, its sequence number, and its type, for example, to determine whether to keep the particular key-value pair or to delete it from the stream.

The compaction tile 402 may further comprise an encoder (not shown in FIG. 4), which receives the KV file format stream from the compaction iterator 408. The encoder converts the KV file format stream back into an SST format stream. It should be understood that in this example embodiment, the encoder is configured to convert the KV file format stream into an SST format stream, although in other embodiments the encoder may be configured to generate other key-value file formats.

Figure 7:
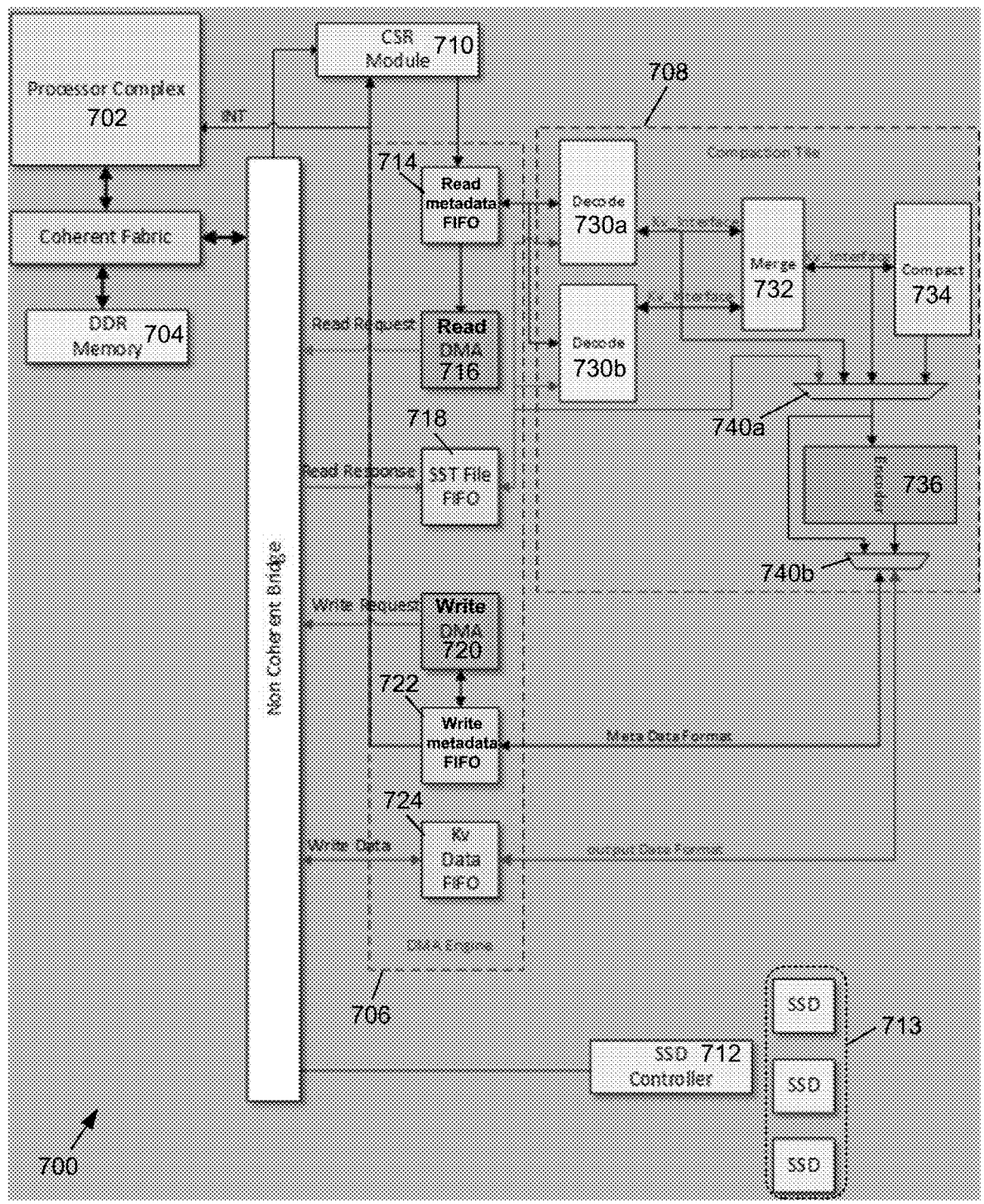
FIG. 7 illustrates an example embodiment of a compaction system architecture according to the invention.

FIG. 7 illustrates an example embodiment of a compaction system architecture 700 according to the invention, which comprises a processor complex 702, a DDR memory subsystem 704, a DMA engine 706, compaction tile 708, configuration and status register (CSR) module 710, and SSD controller 712. The DMA engine 706 comprises a read metadata FIFO 714, read DMA controller 716, SST file FIFO 718, write DMA controller 720, write metadata FIFO 722, and KV Data FIFO 724.

The compaction tile 708 comprises decoders 730a, 730b, merge iterator 732, compact iterator 734, and encoder 736. The compaction tile 708 is used to decode the SST file, merge and perform the compaction, and as well perform the encoding (i.e., converting back into SST file format). With the two decoders 730a, 730b, the compaction tile 708 can handle two SST input files in parallel. The compaction tile 708 also has multiplexors 740a, 740b, which facilitate configuration of the compaction tile 708 to perform certain subsets of processing. In other words, although the compaction tile is capable of decode, merge, compact, and encode processing, the multiplexors 740a, 740b can be used to reroute data around certain of the processing blocks to only perform certain processing subsets. For example, multiplexor 740a may be configured to route the output of merge iterator 732 to the output of multiplexor 740a, and multiplexor 740b may be configured to route the output of multiplexor 740a to the output of the compaction tile 708. Doing so causes the compact 734 and encode 737 processing to be bypassed, so that compaction tile 708 only performs decode and merge processing. The multiplexors 740a, 740b thus facilitate tailoring the compaction tile 708 to operate in certain enterprise-unique situations. For example, in a scenario where a legacy compaction processor is to be used, the compaction tile 708 may be configured so that only the decoder/merge elements are utilized. In general, the compaction tile 708 may be used either to perform full level of compaction which is decode, merge, compaction, and encoding, or perform any of the following tasks:

Decode only
Decode and merge only
Decode and merge and compaction only
Encode only Processor instruction code generates metadata used to access the SST files, and writes the metadata through the CSR module 710 to the read metadata FIFO 714. The read DMA 716 uses the metadata information to generate the DMA access commands required to read the data from the DDR memory 704 and write the SST data to the SST file FIFO 718. The decode blocks 730a, 730b use the metadata in the read metadata FIFO 714 to access the data in the SST file FIFO 718.

At the output, the merged data from the file is written to the KV data FIFO 724. Processor instruction code generates metadata used to access the merged data produced by the compaction tile 708 and stores the metadata in the write metadata FIFO 722. The write DMA 720 uses the metadata information to generate the DMA access commands required to read the merged data from the KV data FIFO 724 and write the merged data to the DDR memory 704.

In operation, SST files are transferred, using the SSD controller 712, from the SSD storage components 713 to the DDR 704. The SST file may be subdivided into multiple data blocks, and each block may be further subdivided into data chunks. Each SST file may be on the order of 100's of MBs, or up to one or more Giga bytes. An example subdivision may produce chunks of 4 KB and blocks each having multiple chunks. The blocks may be sized according to the capacity and processing capabilities of the decoder(s). Each data block may comprise a footer and metadata at the end of the data block. Each data block is separated into multiple chunks, and the chunks are processed by the DMA engine 706 and the compaction tile 708 as described herein with respect to FIG. 7. The SST files (both on the input and output side of a compaction operation) can be compressed or uncompressed. In the compressed case, the decoder/encoder would handle the decompression/compression along with the file format decoding/encoding.

Figure 8A:
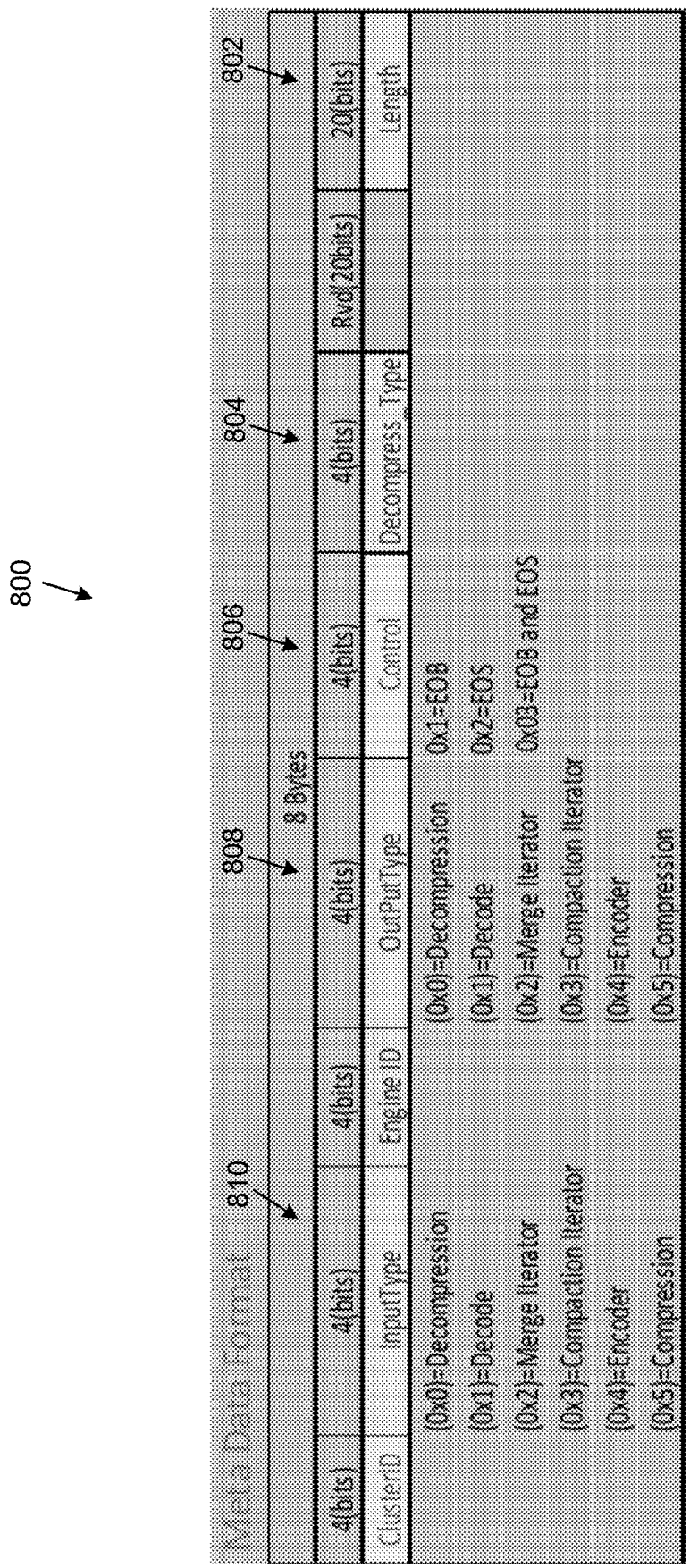
FIG. 8A shows the format of the metadata header.

In an example embodiment, a chunk starts with an 8-byte metadata header 800 followed by a data field. The format of the metadata header 800 is shown in FIG. 8A. The metadata header 800 comprises a length field 802, a decompression type field 804, a control field 806, an output-type field 808, and an input-type field 810. The length field 802 describes the amount of data (e.g., number of bytes) that is in the data field following the header. The decompression type field 804 is a four-bit code that describes the procedure (e.g., algorithm) to be used for compression of the KV data. The control field 806 describes if the current chunk is an end of a block (EOB), an end of sequence (EOS), both, or neither. The output type field 808 and the input type field 810 describe the state of the data entering and leaving the compaction tile 708, respectively. The output type field 808 and the input type field 810 are used to properly configure the compaction tile 708. For the example scenario described herein, where compaction tile 708 only performs decode and merge processing, input type field 810 may indicate an input type of "decompression," and an output type as "merge iterator," thereby identifying the processing subset that the compaction tile 708 should implement.

Figure 8B:
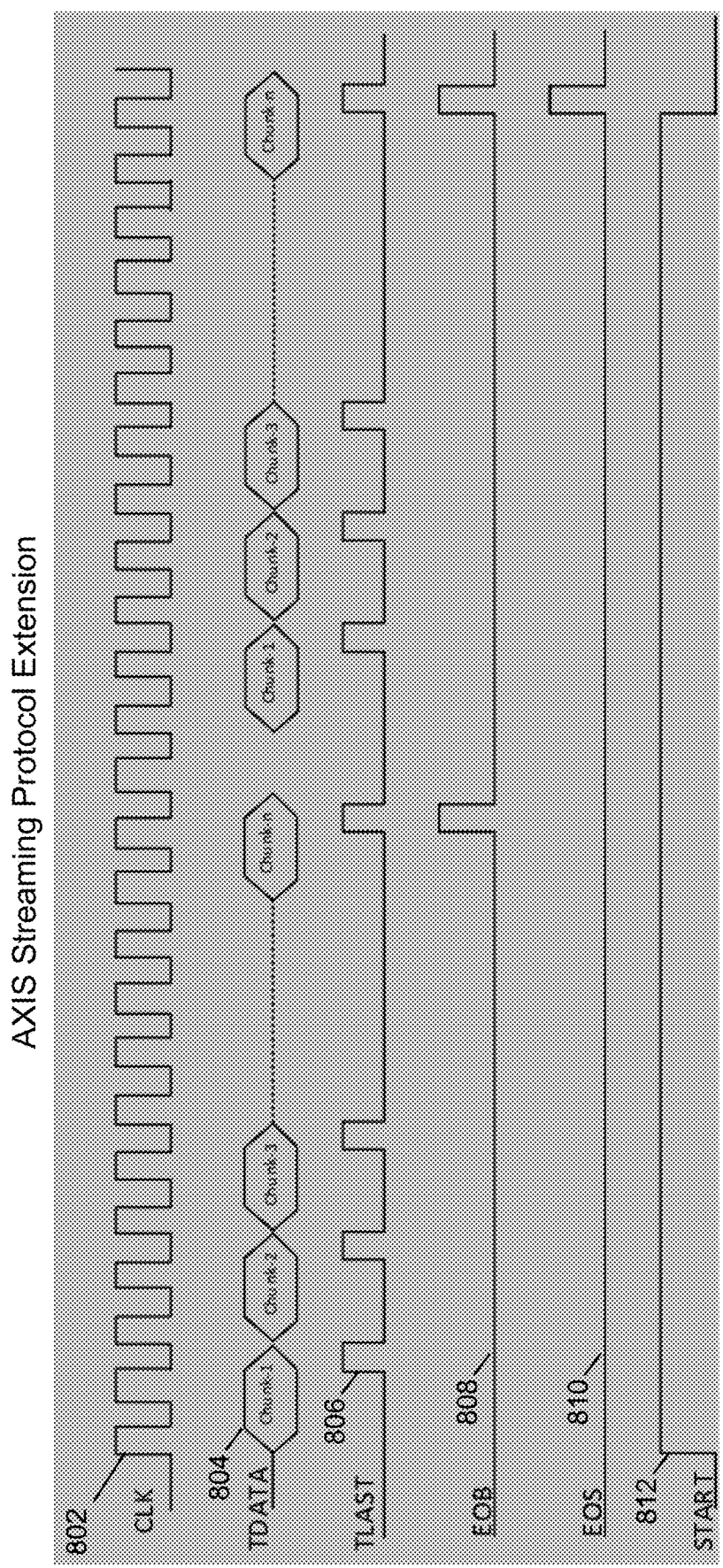
FIG. 8B shows an AXIS protocol extension according to an example embodiment of the invention.

FIG. 8B shows an AXIS protocol extension according to an example embodiment, which is used internally between DMA engine 706 and compaction tile 708. Basic AXIS protocol includes a clock signal (CLK) 802, a data signal (TDATA) 804, and last-of-chunk signal (TLAST) 806. The edges of CLK 802 identify boundaries of the data elements within TDATA 804. The AXIS protocol extension further includes an end-of-block signal (EOB) 808, an end-of-sequence signal (EOS) 810, and a start-of-sequence signal (START) 812.

The EOB signal 808 and the decoder number are embedded in the bit 49 of the data header. When the EOB 808 is detected and the footer (4 bytes of zeros) are found, that is when the end of the data block is reached. Upon detection of the footer, all incoming data (hash index, restart array . . . etc.) is ignored until the transfer "TLAST" signal is asserted, as shown in FIG. 8B.

The end of the SST file (EOS 810) indicator (1 bit) is also embedded in the bit 48 of the data/metadata header. When the last chunk of the SST file data block to the compaction tile 708, this bit will be asserted. The decoder will use the EOS 810 indicator to inform the downstream that there is no more data to process.

Figure 9:
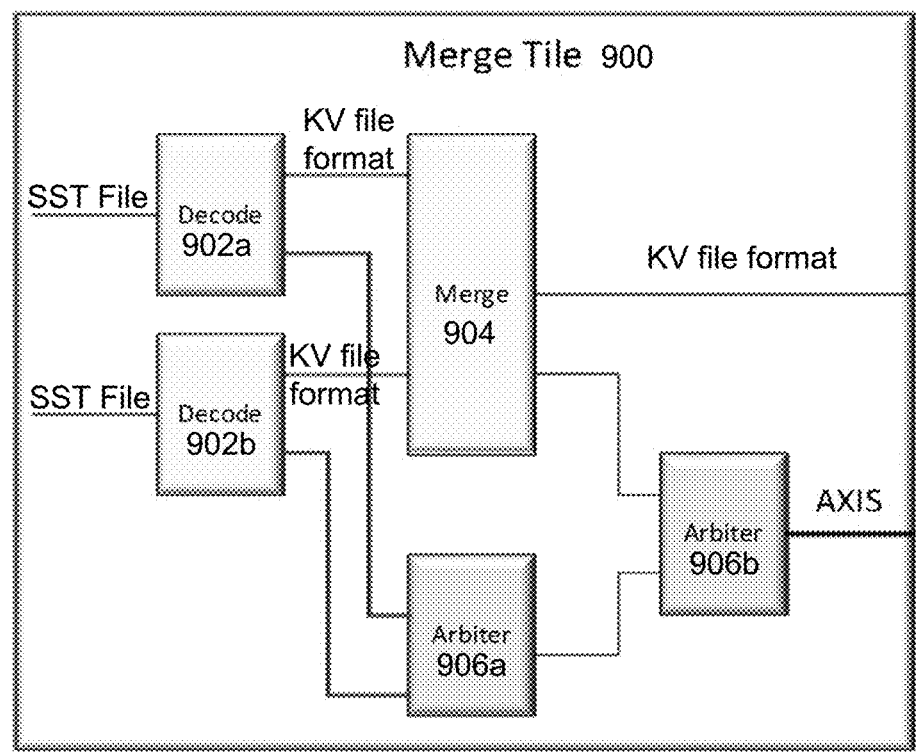
FIG. 9 illustrates an example embodiment of a basic merge tile according to an example embodiment of the invention.

The compaction system architecture 700 depicted in FIG. 7 is an example embodiment that handles two SST files in parallel. For processing more than two SST files in parallel, an architecture using a two-SST file merge tile as a basic building block may be used. FIG. 9 illustrates an example embodiment of a basic merge tile 900, comprising decoders 902a, 902b, merge iterator 904, and arbiters 906a, 906b. As described herein, decoders 902a, 902b each convert an SST file into a KV format data stream. The merge iterator 904 merges the decoded KV file format streams into a single combined KV file format data stream. Arbiters 906a, 906b generate timing signals associated with the KV file format data stream produced by the merge iterator 904.

Figure 10:
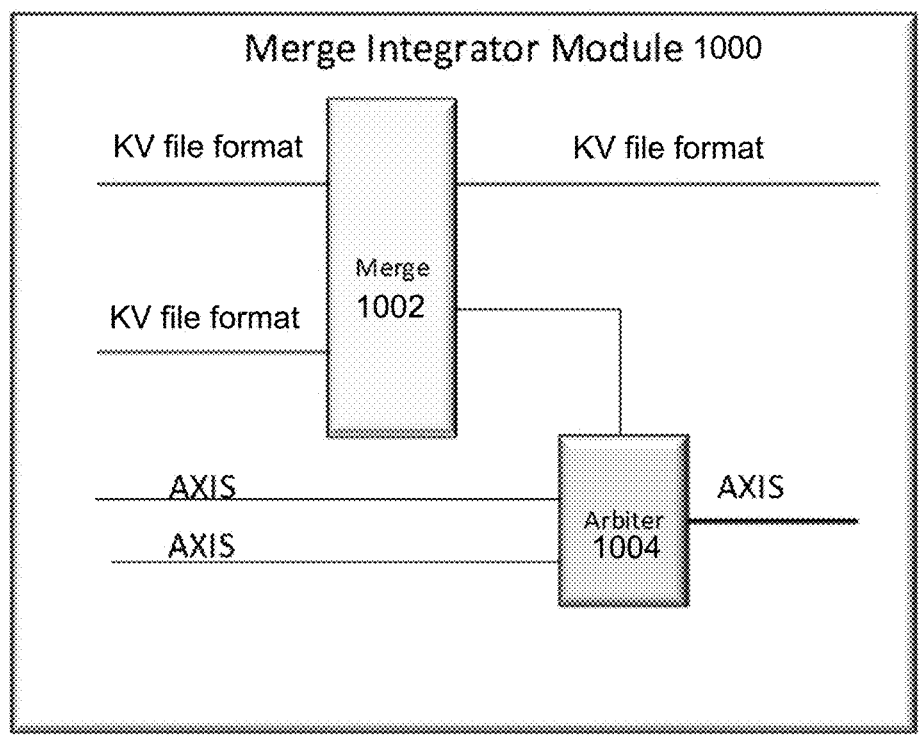
FIG. 10 shows a merge integrator module according to an example embodiment of the invention.

A merge integrator module 1000, depicted in FIG. 10, may be used to form a merge integrator fabric, which in turn is employed to integrate multiple merge tiles 900. The merge integrator module 1000 comprises merge iterator 1002 as described herein, and an arbiter 1004 that generates timing signals associated with the KV file format data stream output from the merge iterator. The arbiter 1004 bases the generated timing signals on timing signals associated with the two KV file format data streams input to the merge iterator 1002.

Figure 11:
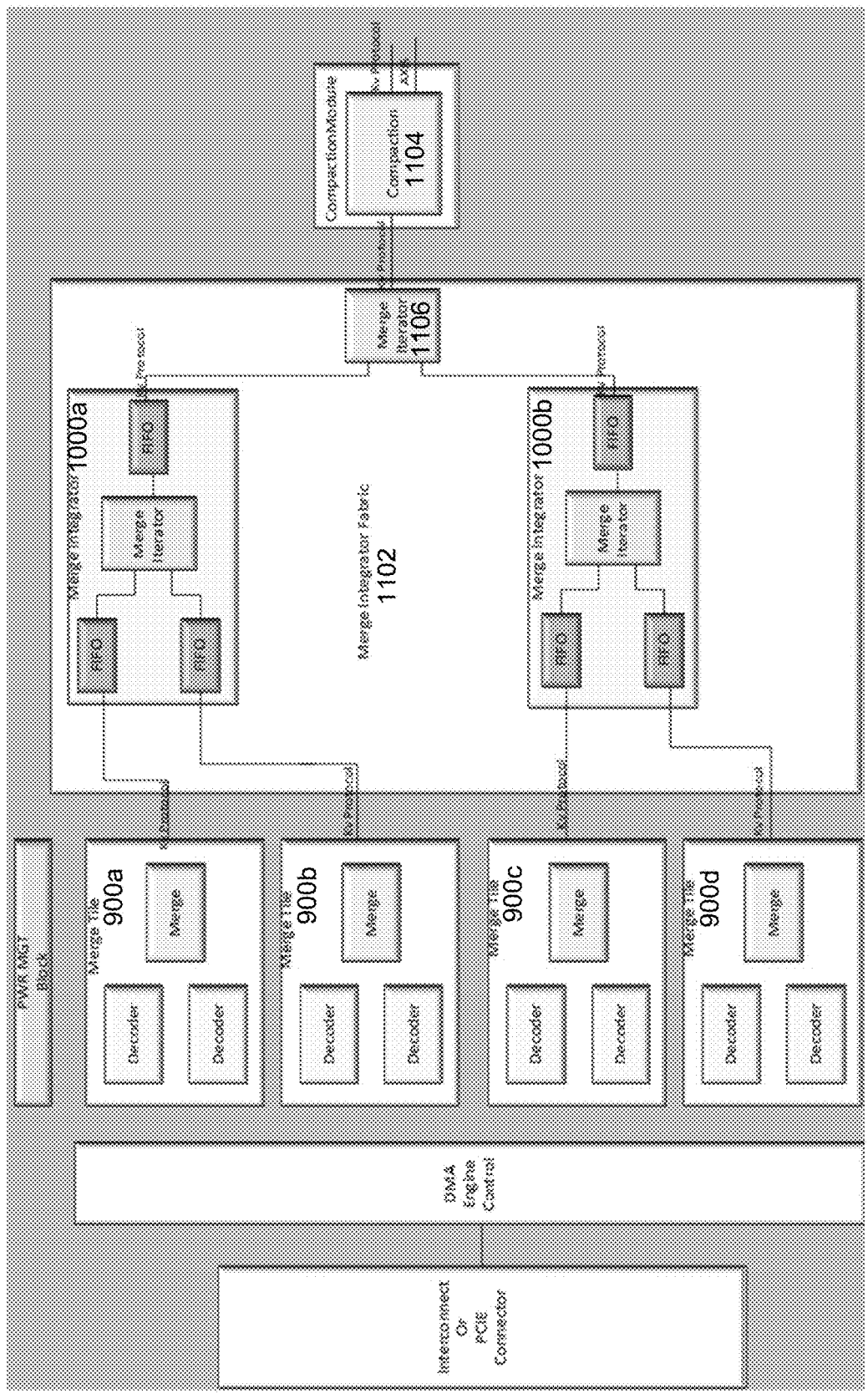
FIG. 11 shows an example compaction architecture according to an example embodiment of the invention.

FIG. 11 shows an example compaction architecture 1100 configured to process eight SST files concurrently, using merge tiles 900 as described herein with respect to FIG. 9, and merge integrator modules 1000 as described herein with respect to FIG. 10. FIG. 11 shows a set of four merge tiles 900a, 900b, 900c, 900d, which together can handle eight SST files in parallel. Each merge tile produces a single KV protocol data stream. A merge integrator fabric 1102, which comprises two merge integrators 1000a, 1000b, merges the four streams from the four merge tiles 900a, 900b, 900c, 900d into two KV protocol data streams, and a merge iterator 1104 as described herein merges the two KV protocol data streams into a composite KV protocol data stream. The merge integrator fabric 1102 may provide the composite KV protocol data stream to a compaction block 1106. This set of four merge tiles 900a, 900b, 900c, 900d (which combines 8 SST files to one output) is referred to herein as a "merge machine" or "machine," and is the basic building block for handling $2^N$ SST files. Although the example embodiments illustrate a machine that merges eight SST files, other embodiments based on the same concepts described herein may be configured or otherwise implemented to merge other numbers of SST files.

FIG. 11 also shows a power management module 1106, which may monitor the activity of each merge tile. Based on certain conditions, the power management module 1106 may place one or more of the merge tiles 900a, 900b, 900c, 900d in a low power mode (e.g., completely turned off, a sleep state, stand-by mode) for power saving purposes. A transition from the low power mode to a normal mode may be based on the SST Table Register entry. For example, if only two SST files are to be merged and compacted, then the power management module 1106 may place the remaining merge tiles in the low power mode.

The architecture described herein may be configured to handle parallel execution of different compaction jobs. For example, some machines may be used to do full compaction for a set of SST files, while other machines may be used for only decode and merge for another set of SST files. In other words, multiple independent jobs may be processed by subsets of the machines. The SST header format may be used to inform the machines(s) about the type(s) of operation(s) to be performed on the data.

Figure 12:
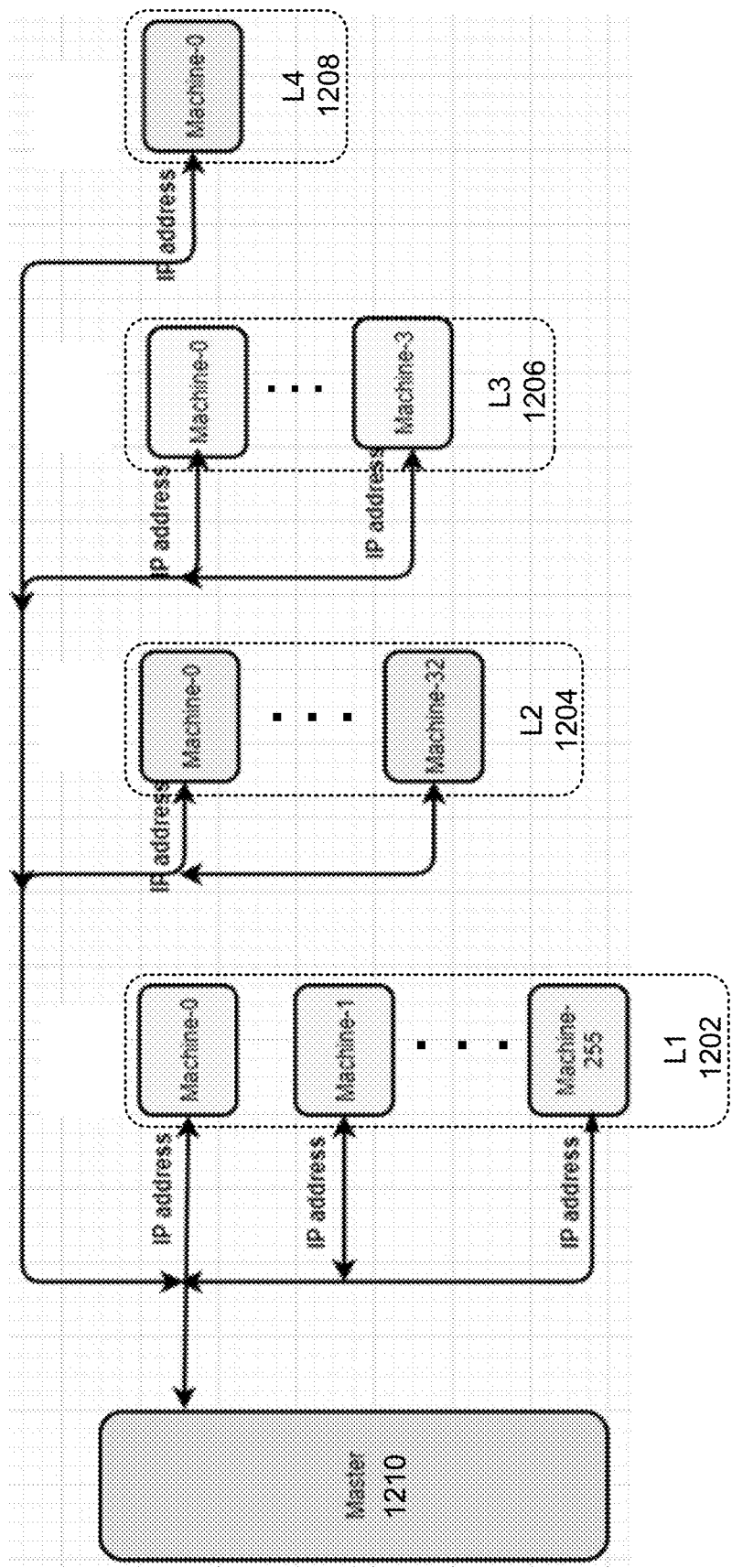
FIG. 12 shows an example embodiment in which 1024 input SST files are processed in parallel.

FIG. 12 shows an example for which 1024 input SST files are to be processed in parallel. At the first level 1202 (L1), 256 machines, each handling eight SST files, process the incoming 1024 SST files (i.e., 256×8=1024). At the second level 1204 (L2), the 256 merged outputs of the L1 machines are handled by 32 machines (i.e., 32×8=256). At the third level 1206 (L3), the 32 merged outputs of the L2 machines are handled by 4 machines (i.e., 4×8=32). At level 4 1208 (L4), only one machine is needed to handle the 4 merged outputs of the L3 blocks, where four of the eight inputs to the machine are unused. In one example embodiment, the four levels of merging 1202, 1204, 1206, 1208 are implemented using hardware-based merge tiles and merge integrator fabric as described herein. This hardware-based merging architecture may be referred to herein as a hardware compaction accelerator.

As shown in FIG. 12, each machine in the example hardware compaction accelerator may be addressable through an IP address. Accordingly, the host computing platform 1210 may set up the hardware compaction accelerator by configuring each constituent merge tile by addressing it through its IP address through the Internet or other network.

In one example embodiment, the machine architecture described with respect to FIG. 12 may utilize a host computing platform for coordination of the decoding, merging, compaction, and encoding processing described herein. That host computing platform, shown symbolically as master 1210 in FIG. 12, could be local to the SST database, or it could be deployed in a server farm that is accessible via the cloud (i.e., computing resources accessed by way of the Internet). Accordingly, compaction may be requested via the cloud to accomplish a large compaction job. In this embodiment, instruction code running on the host computing platform may (i) send the 1024 SST files to the L1 machines for processing and receive the 256 KV protocol data streams from the L1 machines, (ii) send the data from the 256 KV protocol data streams to the L2 machines for processing and receive 32 KV protocol data streams from the L2 machines, (iii) send the data from the 32 KV protocol data streams to the L3 machines for processing and receive four KV protocol data streams from the L3 machines, and (iv) send the data from the four KV protocol data streams to the L4 machine for processing and receive single resulting KV protocol data streams from the L4 machine.

In another example embodiment, the host computing platform may pass the 1024 SST files to the L1 through L4 machines and provide no further interaction until the L1 through L4 machines return the single KV protocol data stream. In this embodiment, the L1 through L4 machines operate as a self-contained processing block without the need for coordination by the host processing platform. The self-contained processing block may include an internal processor, controller, or state machine for facilitating the progressive merging through the levels L1 through L4 as set forth herein.

The example embodiments described herein operate on a specific number of input SST files, though it should be understood that these numbers are used for descriptive purposes only, and that the concepts described herein are scalable to other numbers of input SST files.

While example embodiments have been particularly shown and described, it will be understood by those skilled in the art that various changes in form and details may be made therein without departing from the scope of the embodiments encompassed by the appended claims.

What is claimed is:
1. A compaction accelerator, comprising:
a direct memory access (DMA) controller configured to access one or more sorted string table (SST) files in a database system;
two or more merge tiles, which operate independent of the database system, that receive the one or more SST files from the DMA controller, each merge tile comprising merge tile components of:
two or more decoders, each of which converts one of the one or more SST files into a corresponding key-value (KV) format data stream, wherein the key-value (KV) format comprises an ordered set of key-value pairs;

a merge iterator that receives the KV format data stream from each of the two or more decoders, and combines the KV format data streams into a single KV format data stream;

at least one arbiter that generates one or more timing signals associated with each of the KV format data streams, the one or more timing signals configured to coordinate transfer of KV format data streams through the two or more merge tiles;

at least one multiplexer for selectively routing a data path through the two or more merge tiles;

at least one of the merge tile components is configured to be formatted by metadata information that accompanies the one or more SST files, the metadata information provided to the merge tile by an external resource that addresses the merge tile through an address associated with the merge tile;

at least one merge integrator that receives the single KV format data stream from each of the two or more merge tiles and produces a composite KV format data stream therefrom; and the two or more merge tiles and the at least one merge integrator are implemented, at least partially, as hardware components.

2. The compaction accelerator of claim 1, further comprising a compaction module that receives the composite KV format data stream and produces a compacted data stream, wherein the compacted data stream has an amount of data less than an amount of data in the composite KV format data stream.

3. The compaction accelerator of claim 1, wherein the compaction module removes redundant data from the composite KV format data stream.

4. The compaction accelerator of claim 1, wherein the compaction module removes data that has exceeded an expiration time threshold.

5. The compaction accelerator of claim 1, wherein the hardware components comprise a field programmable gate array, an application-specific integrated circuit, a processor operatively coupled to a memory that contains processor instruction code, and/or a microcontroller operatively coupled to a memory that contains microcontroller instruction code.

6. The compaction accelerator of claim 1, wherein the address associated with the merge tile is an Internet Protocol (IP) address.

* * * * *